March 25, 1958 C. B. PEAR, JR 2,828,459

MAGNETIC TAPE PLAYBACK SPEED CONTROL SYSTEM

Filed April 21, 1953

INVENTOR

CHARLES B. PEAR, JR.

BY Scrivener & Parker

ATTORNEYS 2,828,459
Patented Mar. 25, 1958

2,828,459

MAGNETIC TAPE PLAYBACK SPEED CONTROL SYSTEM

Charles B. Pear, Jr., College Park, Md., assignor, by mesne assignments, to Minneapolis-Honeywell Regulator Company, a corporation of Delaware Application April 21, 1953, Serial No. 350,015

1 Claim. (Cl. 318—318)

Figure 1:
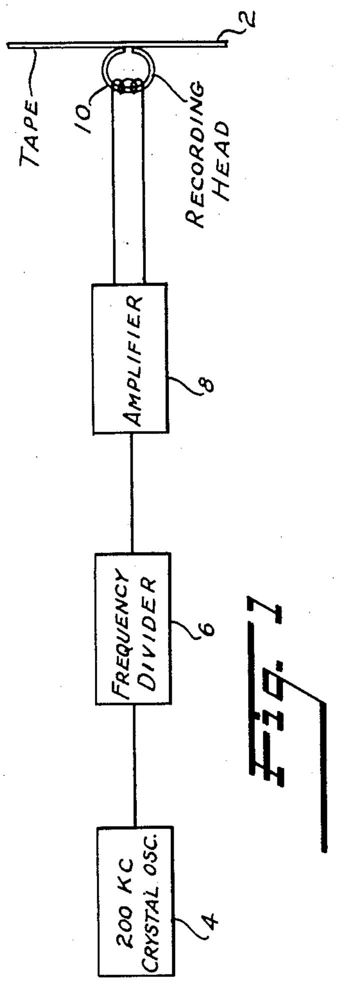

This invention relates to magnetic tape recording devices and systems, and is particularly intended to provide new and improved means for causing the tape to be operated at the same speed during playback as it is operated during recording.

In many applications of magnetic tape recording, particularly in instrumentation and where sound is recorded to be synchronized with moving pictures, it is important that the frequencies as reproduced be the same, to a high degree of precision, as those originally recorded. This would be true without further complication if the speed with which the tape moved past the playback head were exactly the same as that at which it moved past the recording head, and if the tape itself did not change dimensions between recording and playback. Ordinary tape transport mechanisms provide as a primary control of the tape speed a capstan driven by a synchronous motor with a filter system and usually a rubber-tired pressure roller to prevent the tape from slipping as it is pulled by the capstan. Identical tape transport systems may or may not be employed for recording and playback. In either case it is possible that the frequency of the power supply to the synchronous motors may differ from the time of recording to the time of playback introducing an error which in the case of ordinary commercial power sources may amount to 0.25%. There may also be a variable amount of slippage at the capstan. If the recording and playback tape transport equipments are not identical, differences in the capstan dimensions and the coupling to the motor may introduce additional differences. If the recorder is an airborne unit operated from a D. C. supply, the voltage may vary and the ambient temperature may change anywhere in the range from +163° F. to −89° F., in which case, it will be understood, there is ample opportunity for considerable variation in the recording tape speed, whereby a simple playback system would be unlikely to reproduce exactly the original tape speeds.

In addition to the sources of error due to differences in the tape transport mechanisms the tape materials at present available are not dimensionally stable. Ordinary commercial magnetic tape made with plastic or paper base may change dimensions by as much as 2% with the changes in humidity and temperature normally encountered.

By this invention I have provided means for causing the tape to be operated during playback at substantially the exact speed as during recording, to thereby substantially exactly reproduce the recorded frequencies. I achieve this by means of a control or reference signal of known stable frequency recorded on an extra channel on the tape, and by means responsive to this recorded frequency to control the speed of the tape during playback.

Figure 2:
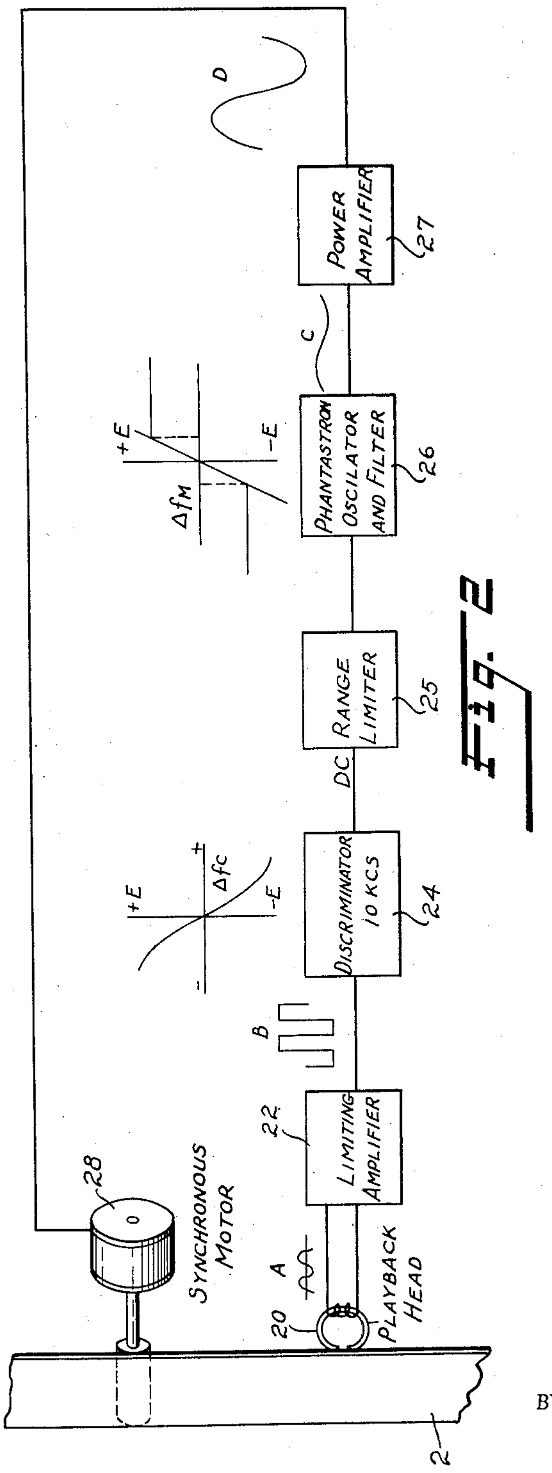

A tape speed control system according to the invention is disclosed in the drawings forming part of this application, in which:

Fig. 1 is a schematic diagram of the means for recording the control frequency on the tape, and Fig. 2 is a schematic diagram of the means at the playback station for controlling the tape speed by means of the control frequency.

In the system disclosed in the drawings, a control system having a frequency of 10 kilocycles is recorded on the magnetic tape 2 by means of a crystal oscillator 4 supplying a frequency of 200 kilocycles to a frequency divided 6 which reduces the frequency to 10 kilocycles. This frequency is amplified at 8 and supplied to the recording head 10 for recording on the tape 2.

At the playback station the speed of the tape is so controlled that the recorded control signal has a frequency of exactly 10 kilocycles. This is accomplished by the means disclosed in Fig. 2, in which the tape 2 is operated past the playback head 20 which picks up the control signal and supplies it, in the wave form shown at A, to a limiting amplifier 22 in which the wave form is changed to that shown at B which is fed to a discriminator 24 which is sharply tuned to 10 kilocycles. The amplifier 22 may be of a known type and for a description of a suitable type reference is made to page 333 of the text, "Theory and Application of Electron Tubes," by J. H. Reich, McGraw-Hill, 1944. A discriminator of a type that may be employed with the present invention is described on page 335 of the referenced text. More specifically the discriminator 24 is preferably a tuned circuit type having two resonant circuits, one at a frequency slightly above and the other slightly below the operating frequency of the discriminator. These tuned circuits constitute a reference with which the tape signal is measured to detect deviations, rather than a fixed reference frequency from some stable source. The voltages across each of these resonant circuits are rectified and subtracted in this form of discriminator so that when they are equal the output is zero. This can only occur when the input frequency is centered between the two resonances, and as it is shifted one or the other becomes greater to produce a net positive or negative output. The output of the discriminator is a D. C. voltage which is proportional in magnitude to the magnitude of the departure of the control signal from 10 kilocycles and the polarity of which depends on whether the departure is above or below 10 kilocycles. This D. C. voltage is fed to a range limiter 25 of the type described at page 358 of the referenced text and which prevents the output frequency of the phantastron from falling far enough below its predetermined output frequency, such as 60 C. P. S. in the example given, that the system would lock in at some integral fraction of the correct tape speed at which the discriminator would respond to a harmonic of the control frequency. This D. C. voltage is supplied to a phantastron oscillator 26 having a normal output frequency, such as 60 C. P. S., which will produce the normal average tape speed required by a recording made under average conditions at the recorder. A typical phantastron oscillator suitable for this purpose is described on page 368 of the referenced text. The output of oscillator 26, having the wave form shown at C, is amplified at 27, a power amplifier suitable for this purpose being described at page 222 of the refernce text, producing the wave form shown at D, until it has sufficient energy to operate a synchronous motor 28 which drives the capstan of the playback system. Thus, if the speed of the tape past the playback head falls below the predetermined speed the control frequency picked up by the playback head will be low and a voltage will be produced at the discriminator output which will be sufficient to increase the frequency of the phantastron oscillator, thereby causing the synchronous motor to speed up the tape.

It is, of course, not possible to entirely eliminate the output frequency variations, but it is possible to reduce them by a factor proportional to the effective gain of the system. In the described system this gain is dependent on the sensitivities of the discriminator in converting frequency change to D. C. volts and of the phantastron oscillator in converting D. C. volts into a frequency change. While these sensitivities are normally sufficient, it would be possible if they are not, to insert an amplifier between the discriminator and the phantastron to give additional gain and so further reduce the variation in the reproduced frequency.

While I have described and illustrated one embodiment of my invention, it will be apparent to those skilled in the art to which the invention relates that other embodiments, as well as modifications of that disclosed, may be made and practised without departing from the spirit or scope of the invention, for the limits of which reference must be made to the appended claim.

What is claimed is:

In a magnetic tape recording and playback system, the method of reproducing the recording speed of the tape during playback which consists in impressing on the tape during recording a stable, accurately known frequency, selecting said frequency from the signal derived from the tape during playback, limiting the amplitude of said frequency and applying it to an electronic discriminator to produce a control voltage proportional to the variation of the reproduced frequency from the original frequency, limiting the control voltage to values at which it cannot drive the tape at a speed sufficient to permit harmonics of the recorded signal to produce zero control voltage, and impressing this voltage on an oscillator having a normal output frequency which will produce the average tape speed and amplifying the output from said oscillator to operate a synchronous motor which controls the drive of the playback system.

References Cited in the file of this patent

UNITED STATES PATENTS

| | | |
|---|---|---|
| 2,334,510 | Roberts | Nov. 16, 1943 |
| 2,395,516 | Morton et al. | Feb. 26, 1946 |
| 2,627,596 | Andrews | Feb. 3, 1953 |
| 2,656,419 | Dingley | Oct. 20, 1953 |